Patented Feb. 26, 1929.

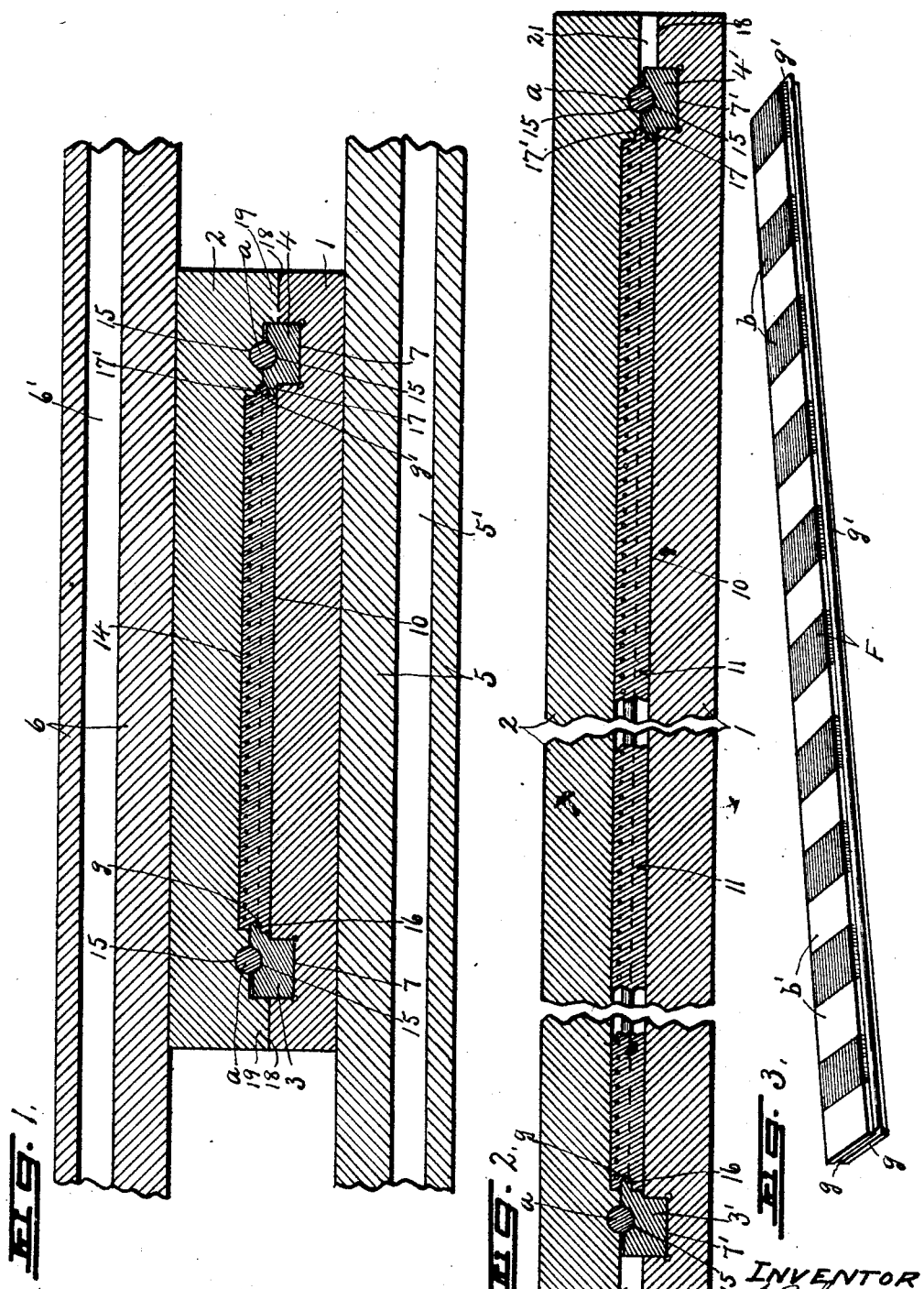

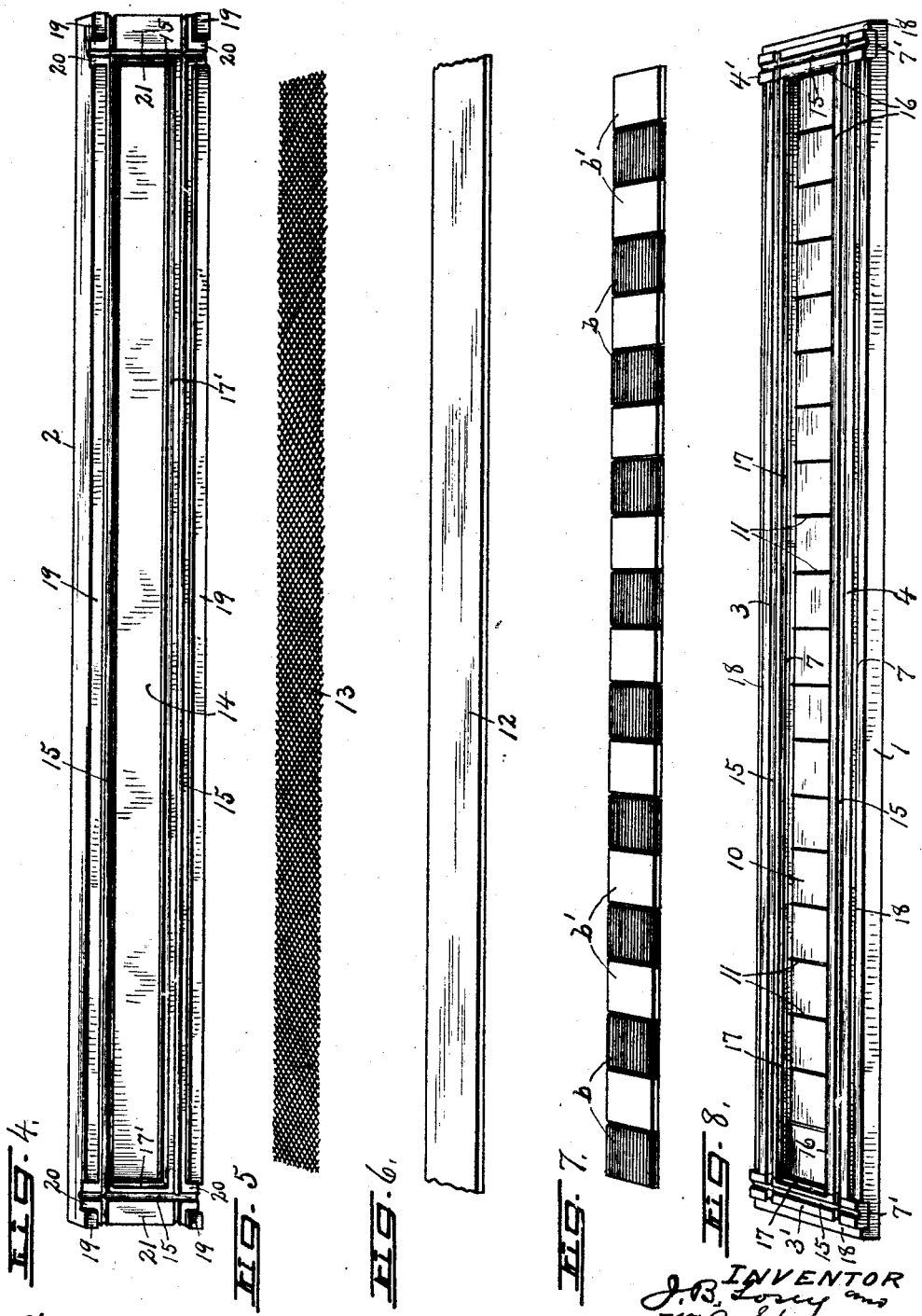

1,703,312

UNITED STATES PATENT OFFICE.

JOHN B. LOSEY AND WALTER R. STONE, OF SYRACUSE, NEW YORK.

MANUFACTURE OF RUBBER COMPOSITION FLOORING.

Application filed November 3, 1925. Serial No. 66,517.

This invention relates to the manufacture of rubber composition flooring, wainscoting and analogous articles.

The main object is to provide a simple, economical and efficient method of producing articles of this character from flat pieces of rubber composition material applied to each other face to face under heat and pressure sufficient to form a homogenized article.

Another object is to make the surface sections of relatively small area as compared with the base section and, if desired, of different colors so as to permit the formation of varying designs in the individual or assembled articles.

A further object is to mold the entire unit with a tongue and groove in opposite edges thereof in one and the same operation.

Another object is to form each unit with a relatively soft pliable base and relatively harder surface sections and to leave the surface sections unattached to each other to compensate for slight expansion and contraction and enable the flooring to conform more readily to uneven supporting surfaces.

Other objects and uses will be brought out in the following description.

In the drawings:—

Figure 1 is a transverse vertical sectional view of a mold with a section of flooring formed therein, together with portions of the lower and upper heated pressing elements for forcing the sections of the mold into pressing co-action upon the article.

Figure 2 is a longitudinal sectional view, partly broken away, of the detached mold with a section of flooring therein.

Figure 3 is a perspective view, on a reduced scale, of a section of flooring made under my improved apparatus and process.

Figures 4, 5, 6, 7 and 8 are perspective views, on a reduced scale, of the upper section of the mold, the reinforcing fabric, the rubber-composition sheet forming the base of the flooring, the rubber-composition plates to be applied to one of the surfaces of the sheet, and the lower section of the mold respectively, the ends of the sheet in Figure 6 being broken away.

The apparatus shown in the drawings for carrying out the process and product comprises lower and upper mold sections —1— and —2—, opposite lengthwise insert sections —3— and —4— and corresponding end insert sections —3'— and —4'—, all of which are constructed and assembled in such manner as to form in one operation a complete strip of flooring of the desired length, width and thickness with a tongue and groove along opposite lengthwise edges and also along the opposite end edges, said apparatus also including lower and upper pressing elements —5— and —6— which are provided with chambers —5'— and —6'— for receiving steam or other heating agent whereby the dies and article under formation between them will be subjected to heat and pressure at one and the same time.

The dies or mold sections —1— and —2— are preferably rectangular and of somewhat greater length and width than the article to be formed between them so as to form rigid marginal walls around the chamber in which said article is formed for receiving the insert sections —3— and —4— and —3'— and —4'—, said mold sections being preferably made of steel or equivalent material having polished surfaces particularly where contacting with the article.

The upper face of the lower die or mold section —1— is provided with transversely spaced lengthwise grooves —7— near its opposite longitudinal edges for receiving the lengthwise die sections —3— and —4— and is also provided with transverse grooves —7'— near the ends thereof for receiving the die sections —3'— and —4'—. The grooves —7— and —7'— are of less depth than the thickness of their corresponding die sections —3— and —4— which when seated in their respective grooves project beyond the upper surface of the section —1— and form an upwardly projecting marginal rib along the sides and ends of the last-named section with the upper face of the ribs disposed in substantially the same horizontal plane parallel with the bottom surface of the section —1—.

These ribs or dies sections —3— and —4— —3'— and —4'— are provided in their upper sides with lengthwise grooves —15— communicating with each other at the corners and extending to the exterior sides and ends of the ribs to form clearance channels for the reception of excess stock which may be pressed from the article during its formation under heat and pressure by the pressing elements —5— and —6—, this extra material as —a— in the grooves being shown by circles in Figures 1 and 2.

The lower die or mold section —1— is also provided in its upper side with a central rectangular chamber —10— extending the entire distance between the end die sections —3'— and —4'— and also the entire transverse distance between the lengthwise die sections —3— and —4— for receiving the several rubber-composition plates as —b— and —b'—, Figure 7, which are arranged end to end in said chamber.

The bottom wall of the chamber —10— is provided with a series of relatively thin and shallow transverse ribs or spacing members —11— arranged in uniformly spaced relation longitudinally and corresponding to the lengths of the rubber composition plates which are adapted to be placed between them. That is, the ribs —11— and side and end walls of the chamber —10— form a series of square pockets, each receiving one of the rubber composition plates as —b— and —b'— which in this instance are square and of approximately the same thickness as the depth of the ribs or pockets formed thereby although in practice the ribs may be of slightly less depth than the thickness of the plates so as to assure proper vulcanizing of the ends of the plates to the overlying rubber composition sheet.

These ribs serve to prevent the vulcanization of the meeting edges of the plates to the rubber composition sheet while the various layers of the flooring are being pressed together under heat so that when the flooring is completed the meeting ends of the plates which were slightly separated by the ribs —11— during the vulcanizing operation will when the flooring is completed and removed from the dies, substantially close under the inherent elasticity of the material to form a smooth surface and at the same time preserve a definite amount of flexibility of the flooring to enable it to conform more readily to uneven surfaces of the underlying floor bed.

These plates —b— and —b'— are adapted to be assembled upon one face of a rubber composition strip —12— of approximately the same length and width as the chamber —10— in the die —1—, the thickness of the strip being approximately equal to or slightly greater than that of the plates or of sufficient thickness to permit the formation of tongues and grooves in the marginal edges of the completed flooring in a manner presently described.

A layer —13— of wire fabric of substantially the same surface dimensions as the strip —12— is adapted to be applied to the other surface thereof in such manner as to be imbedded and entirely concealed in said surface during the vulcanizing operation.

The upper die —2— is of substantially the same length and width as the lower die —1— and is provided in its underside with a central lengthwise chamber —14— of approximately the same dimensions as the chamber —10— with which it is adapted to register when the mold sections are assembled for use.

The upper wall of the chamber —14— is substantially flat and together with the bottom wall of the chamber —10— determines the thickness of the flooring when completed, said upper die —2— being also provided in its underside with a marginal grooves —15— surrounding the chamber —14— and registering with the grooves —15— in the die sections —3— and —4— and —3'— and —4'— for receiving excess material which may be discharged from the chambers —10— and —14— during the formation of the flooring with the dies.

One of the lengthwise die sections as —3— and one of the end dies as —3'— are provided with inwardly projecting ribs —16— in the same horizontal plane and approximately midway between the bottom wall of the chamber —10— and top wall of the chamber —4— to form grooves —g— in the corresponding edges of the completed flooring —F—.

The other lengthwise die section —4— and also the remaining end sections —4'— are provided along their inner edges with lengthwise grooves —17— cooperating with opposed grooves —17'— in the adjacent lengthwise and end walls of the die section —2— to form suitable tongue —g'— on the remaining lengthwise edge and end edge of the completed flooring strip —F—, the space between the lower and upper walls of the grooves —17— and —17'— being disposed in substantially the same horizontal plane as the rib —16— on the die sections —3— and —4— to assure the proper matching of the flooring strips when assembled edge to edge or end to end.

As previously stated when the die sections —3— and —4— and —3'— and —4'— are assembled in their respective grooves in the die section —1— they project slightly above the upper surface of said die section —1— and thereby form with the last-named die section marginal rabbets —18— while the lower side of the upper die section —2— is formed with corresponding marginal flanges —19— extending along its opposite lengthwise and end edges as shown in Figure 4.

The portions of the lengthwise flanges —19— registering with the end die sections —3'— and —4'— are cut-away at —20— to receive the adjacent portions of the end sections —3'— and —4'— when the die sections —1— and —2— are brought into pressing coaction upon the interposed flooring material.

The central portions of the end flanges —19— are also cut away to form openings —21— communicating with the adjacent end grooves —15— to permit the expulsion therethru of excess material which may be expelled from the rubber composition material of the flooring strip during the vulcanizing process.

Process.

Assuming that the rubber composition sheet —12— has been previously made to the desired length, width and thickness corresponding to the length, width and depth of the chambers —10— and —14— of the mold and that the plates —b— and —b'— have been previously cut to the desired form and size corresponding to the form and size of the pockets between the ribs —11—. Then the die section —1— with its insert sections —3— and —4— and —3'— and —4'— thereon is placed preferably in a horizontal position upon a suitable support with the open side of the chamber —10— uppermost.

The plates —b— and —b'— are then placed in the pockets between the ribs —11— in the chamber —10— until all the pockets in said chamber are filled, the plates of different colors, when different colors are used being alternately placed.

The sheet —12— is then placed flatwise upon the upper faces of the plates —b— and —b'— so that its marginal edges will abut against the inner edges of the die sections —3— and —4— and —3'— and —4'— or in exact registration with the chamber —10—.

The wire fabric reinforcing strip which is of slightly less area than the area of the chambers —10— and —14— and also of slightly less area than the surface area of the sheet —12— is then placed upon the upper surface of said sheet within the marginal edges thereof, the object of the slightly reduced area of the reinforcing fabric being to prevent the projection of the edges thereof beyond the corresponding edges of the flooring strip when the latter is completed and also to enable said reinforcement to be imbedded and concealed entirely within the sheet —12— when the flooring strip is completed.

When the reinforcing fabric is properly placed on the strip —12— the die section —2— is placed in operative position upon the die section —1— so that the flanges —19— will register with the rabbets —18— to hold the die sections against relative endwise or lateral movement. This completes the formation of the mold with the stock therein for forming the flooring, the mold being then inserted between the pressing elements —5— and —6—, one at least of which is operated by hydraulic pressure in any well-known manner commonly known in the use of hydraulic presses capable of subjecting the dies to many tons pressure and as the movable pressing element is operated to effect such pressure they are simultaneously heated by the admission of steam or other heating agent to the chambers —5'— and —6'—, said heat being transferred to the dies —1— and —2— and also —3— and —4— and —3'— and —4'— which in turn impart their heat to the various elements of the flooring composition.

This simultaneous application of pressure and heat to the assembled parts of the flooring causes the softening of the rubber composition element sufficiently to expand the edges thereof against the side and end walls of the chambers —9— and —10— and to form tongues and grooves in and upon the marginal edges of the flooring as previously described.

This pressure and heat applied to the flooring composition also causes the vulcanization of the plates —b— and —b'— to the adjacent surface of the sheet —12— and at the same time owing to the pliability of the rubber composition of the sheet —12— and the unpliability of the wire reinforcement —13—, the latter will become imbedded and entirely concealed within the adjacent surface of said sheet thereby becoming a permanent part of the flooring strip.

It will be evident from the foregoing description that the wire reinforcing fabric may be entirely eliminated and that the form or size of the surface plates and base may be varied at will without departing from the spirit of the invention which contemplates broadly the formation of a flooring from a plurality of layers of rubber composition with tongues and grooves therein in a single operation and in such manner than when completed constitutes a homogeneous whole by incorporating the contiguous faces of the parts one into the other in such manner as to obliterate structural joints.

It is also evident that in the use of rubber composition plates upon a base of similar composition the coloring or ornamentation of the several plates upon the same base may be widely varied thus permitting the formation of different letters or characters or designs in the assembly of the flooring strips upon a floor or other supporting surface. Reference is hereby had to our pending divisional applications Serial Nos. 169,891 and 169,892, both filed February 21, 1927.

I claim:—

1. The herein described method of making laminated flooring consisting in applying a series of square plates of rubber composition to the upper surface of a flat strip of rubber composition, separating the adjacent edges of the plates during vulcanization, vulcanizing the plates to the strip and removing the separating means after vulcanization.

2. The herein described method of making laminated flooring consisting in applying a series of similar plates of rubber composition edge to edge along and upon one of the surfaces of a flat strip of rubber composition, applying a metal reinforcing layer to the other surface of said strip, subjecting the assembled parts to pressure and heat sufficient to vulcanize the plates to the strip and to embed the reinforcing layer entirely within the adjacent surface of the strip, and holding the adjacent edges of the plates against contact with each other during the pressing and heating operations.

3. The herein described method of making laminated flooring comprising the molding of a flat strip of rubber composition of uniform thickness, applying a series of rubber composition plates to one surface of the strip, placing separators between the adjacent edges of the plates, vulcanizing the plates to the strip while the separators are in place, and removing the separators after vulcanization.

4. The herein described method of making laminated flooring comprising the molding of a flat rubber composition strip of uniform thickness and of substantially uniform width from end to end, applying a series of rubber composition plates to one surface of the strip, inserting separators between the adjacent edges of the plates, vulcanizing the plates to the strip while the separators, and removing the separators after vulcanization.

5. The herein described method of making laminated flooring comprising the molding of a flat strip of rubber composition of uniform thickness, applying a series of rubber composition plates of about the same width as the strip to one surface of the strip so that corresponding edges of the plates and strip will coincide, placing separators between the adjacent edges of the plates, vulcanizing the plates to the strip while the separators are in place, molding a tongue and a groove in opposite edges of the laminated body during vulcanization, and removing the separators after vulcanization.

6. The herein described method of making laminated flooring comprising molding a flat rubber composition strip into rectangular form of uniform thickness and uniform width from end to end, applying a series of rubber composition plates to one surface of the strip so that their adjacent edges will be slightly separated one from the other, subjecting the plates and strip to vulcanizing pressure and heat, forming a tongue and a groove in opposite edges of the laminated body, by said pressure and heat, holding the adjacent edges of the plates in separated relation during the vulcanizing of the plates to the strip, and removing the holding means after vulcanization.

In witness whereof we have hereunto set our hands this 28th day of September, 1925.

JOHN B. LOSEY.
WALTER R. STONE.